United States Patent Office.

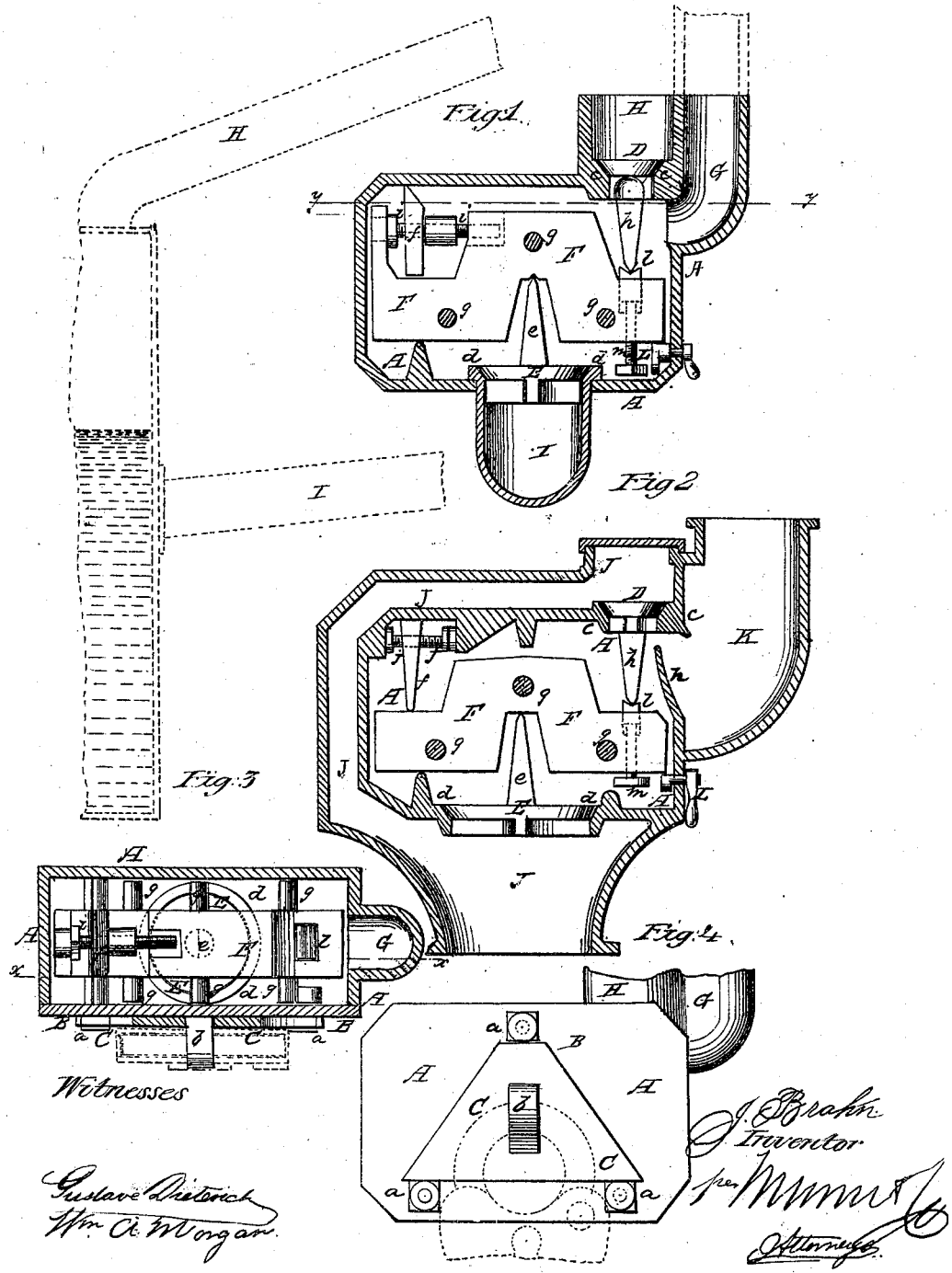

JAMES BRAHN, OF JERSEY CITY, NEW JERSEY, ASSIGNOR TO HIMSELF AND G. E. CUTTER.

Letters Patent No. 91,599, dated June 22, 1869.

---

IMPROVEMENT IN LOW-WATER INDICATORS.

---

The Schedule referred to in these Letters Patent and making part of the same.

---

*To all whom it may concern:*

Be it known that I, JAMES BRAHN, of Jersey City, Hudson county, New Jersey, have invented a new and improved Water-Indicator and Safety-Valve Attachment to Steam-Engines; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my invention, when applied as a water-indicator, the plane of section being indicated by the line $x\ x$, fig. 3.

Figure 2 is a similar view of the same, showing it arranged as a safety-valve.

Figure 3 is a horizontal section of the same, the plane of section being indicated by the line $y\ y$, fig. 1.

Figure 4 is a side view of the same.

Similar letters of reference indicate corresponding parts.

This invention relates to a new device for regulating the height of water in steam-generators.

The invention consists, chiefly, in the arrangement on a chest, in which there is a pivoted lever, of two valves of different size, the smaller one acting on top, and the larger on the under side of the lever.

For a water-indicator, steam is constantly kept on the small valve, to keep both closed.

The large valve is connected, by a pipe, with the lower part of the boiler, and only receives steam when the water falls below the water-line. The large valve will then be opened, and an alarm be given.

The invention consists, also, in providing for an adjustment of the lever-pivot, so that it can be adapted to greater or less steam-pressure, as may be desired.

A, in the drawing, represents a chest or box, made of cast-iron or other suitable material, of suitable size and form.

One of its sides, B, is removable, and can be fastened by means of bolts or nuts $a\ a$, as indicated in fig. 4.

C is a plate, placed on the outside of the plate B, so that it fits well between the heads of the bolts or nuts, to prevent them from being turned.

The plate C has a slot in its middle, which fits over a staple, $b$, that projects from B, as shown.

The bail of a padlock, or any other equivalent device, may be fitted through the staple after the plate C is put on, to lock the same.

A lock-up safety-valve or chest is thus produced by very simple means, as the bolts or nuts cannot be turned as long as the plate C is held in place.

The box A has an opening, $c$, in its upper, and a larger opening, $d$, in its lower side. These openings form valve-seats on their upper sides, as shown, the small valve, D, resting on the seat $c$, and the large valve, E, on the seat $d$, as shown.

F is a lever or bar, arranged within the box A. It is poised upon the stem $e$ of the large valve E, and has a projecting pin, $f$, resting against the top plate of the box A, said pin forming the pivot of the lever, as in fig. 1.

Pins $g\ g$ project from the sides of the lever or box, to prevent lateral play.

The stem $h$ of the small valve D rests on the outer, *i. e.*, non-pivoted end of the lever.

G is a pipe, extending from the box A to a whistle or other alarm-instrument.

The upper valve-opening $c$ is, by a pipe, H, connected with the top of a steam-boiler; the lower valve-opening, $d$, by a pipe, I, with the lower part of the same boiler, under the water-line.

When the water is on or above the water-line, steam will, in the pipe H, press upon the valve D, keeping it closed, and holding the lever F down, to also keep the valve E closed.

When, however, the water should be below the water-line, steam will enter the pipe I, and will press against the under side of the large valve E with such power as to overcome the resistance of the valve D, and of the weight of the lever F, and will open the valves, allowing steam to enter the box A.

The steam will then pass in the pipe G to the whistle or other device, and blow an alarm. Thus a low-water detector is produced.

The pivot $f$ of the lever can be adjusted longitudinally on a screw or other bar, $i$, so that the purchase of the valve D on the lever can be regulated at will.

A steam-pressure indicator and safety-valve is produced by connecting the openings $c\ d$ by means of one single pipe, J, as in fig. 2, said pipe leading to the boiler, so that steam constantly acts on both valves.

As long as the pressure is low, the purchase and weight of the lever F will give an advantage to the valve D, so that the same will hold itself and the valve E closed. But as the pressure increases, the power of the lower valve will increase more rapidly than that of the upper, as the latter is smaller, and as the weight and purchase of the lever do not increase with the pressure of the steam.

If, for example, the area of the lower valve is twice that of the upper, and if, at a pressure of twenty pounds, the lower valve has the full twenty, and the upper, ten pounds of pressure, and if the weight of the lever F, together with the purchase of the same, amounts to twenty pounds, the valve D will have thirty, and E twenty pounds acting on the lever. But when the pressure increases to fifty pounds, the valve D will have twenty-five, plus twenty pounds of the lever, against fifty pounds of the valve E, and consequently the valve E will overcome the resistance of D.

The device, therefore, acts as a safety-valve, if a pipe, k, is provided, to carry off the steam from the box A.

The pivot f may be suspended from a bar, j, which is secured in the box, as in fig. 2, and on which f can be adjusted. In this case, the lower end of f will form the pivot, while in fig. 1 its upper end acts as such.

L is a cam, for raising the lever F, to let off steam whenever desired.

The stem h of the valve D rests on a step, l, which is, by means of a screw, m, up-and-down adjustable in the end of the lever F, as is clearly shown in fig. 1.

It will be understood that by moving the pivot f on the bar i or j, the purchase of the lever can be adjusted to cause the opening of the valve E at a greater or less degree of pressure.

A grate or plate, n, may be arranged in or at the end of the pipe k, to prevent meddling with the lever F through said pipe.

I claim as new, and desire to secure by Letters Patent—

1. The box A, when provided with the small valve on top, to counteract the pressure on the larger valve in the bottom, substantially as herein shown and described.

2. The water-indicator, consisting of the box A, having the lever F and the valves D E, which are kept closed, by pressure on D, as long as the water is high in the boiler, while they will be opened when there is not enough water in the boiler, substantially as herein shown and described.

3. The lever F, provided with an adjustable pivot, f, substantially as herein shown and described.

4. The lever F, when arranged in a box, A, between two valves of different size, substantially as herein shown and described.

JAMES BRAHN.

Witnesses:
FRANK BLOCKLEY,
ALEX. F. ROBERTS.